United States Patent

Kühler

[11] Patent Number: 6,095,236
[45] Date of Patent: Aug. 1, 2000

[54] HEAT EXCHANGER, IN PARTICULAR FOR A HEATING AND COOLING CONFIGURATION OF AN EXTRUDER BARREL

[75] Inventor: Paul Kühler, Bassersdorf, Switzerland

[73] Assignee: Grueter Elektroapparate AG, Bassersdorf, Switzerland

[21] Appl. No.: 09/132,946
[22] Filed: Aug. 11, 1998
[30] Foreign Application Priority Data Aug. 19, 1997 [CH] Switzerland .............. 1940/97

[51] Int. Cl.⁷ .................................. F28F 7/00
[52] U.S. Cl. .................. 165/80.1; 165/154; 165/183; 165/80.1; 165/11; 219/535; 392/480
[58] Field of Search ............. 165/64, 80.1, 154, 165/183; 219/535; 392/480

[56] References Cited

U.S. PATENT DOCUMENTS

| | | |
|---|---|---|
| 2,589,262 | 3/1952 | Keith . |
| 3,474,513 | 10/1969 | Allingham .............. 165/154 |
| 3,716,750 | 2/1973 | Nakada . |
| 4,565,921 | 1/1986 | Piazzola .................. 219/550 |
| 4,828,020 | 5/1989 | Guhl et al. ............... 165/64 |
| 5,200,205 | 4/1993 | Wissmann . |
| 5,561,338 | 10/1996 | Roberts . |
| 5,814,790 | 9/1998 | Bondeson et al. ........ 219/421 |

FOREIGN PATENT DOCUMENTS

| | | |
|---|---|---|
| 1462160 | 12/1966 | France . |
| 0611251A1 | 8/1994 | France . |
| 1 301 666 | 1/1973 | United Kingdom . |
| 2 037 069 | 7/1980 | United Kingdom . |

*Primary Examiner*—Allen Flanigan
*Attorney, Agent, or Firm*—Townsend and Townsend and Crew LLP

[57] ABSTRACT

The heat exchanger consists of at least partially connected fins, which run obliquely with respect to one another, and are disposed in a hollow-cylindrical fashion. The sides connecting the fins at their ends form the surfaces of the hollow cylinder. The heat exchanger is disposed between the extruder barrel and the band-shaped, flexible heating element of the heating and cooling configuration. Good heat exchange results, i.e. a quick heating up and cooling down of the extruder barrel and a homogeneous temperature distribution on the extruder barrel. The heat exchangers can be disposed in a row.

16 Claims, 13 Drawing Sheets

HEAT EXCHANGER, IN PARTICULAR FOR A HEATING AND COOLING CONFIGURATION OF AN EXTRUDER BARREL

BACKGROUND OF THE INVENTION

This invention relates to a heat exchanger, in particular for a heating and cooling configuration of an extruder barrel, as well as to a heating and cooling configuration for an extruder barrel with a heat exchanger.

In heating and cooling configurations for extruder barrels known so far, the temperature distribution on the extruder barrel is not homogeneous. The efficiency of the cooling is not optimal. The intake zone of extruders and injection molding machines until now has always had to be cooled with water. This water cooling is complex and expensive.

SUMMARY OF THE INVENTION

It is an object of the present invention to create a heat exchanger in which the drawbacks of the state of the art are avoided. The result should a good heat exchange, i.e. a quick heating up and cooling down of the extruder barrel. The temperature distribution on the extruder barrel should be optimally homogeneous. With this heat exchanger, moreover, it should be possible for the intake zone of both extruders and injection molding machines to be air-cooled as well.

This object is attained according to the invention by means of at least partially joined fins, which run obliquely with respect to one another, and which are disposed hollow-cylindrically, the sides, which connect the fins at their ends, forming the surface of the hollow cylinder.

In addition, it is an object of the present invention to create a heating and cooling configuration for an extruder barrel, with a heat exchanger according to the invention, with which configuration the above-mentioned objects can be attained. This is achieved in that the heat exchanger is disposed between a band-shaped, flexible heating element and the extruder barrel.

In a preferred embodiment, a temperature measuring probe, extending into the extruder barrel, is mounted on the fins between at least two configurations.

The heat exchanger has the advantage that several heat exchanging elements can be disposed in a row. It is also possible, however, to provide just one heat exchanger, designed longer. Furthermore there is the possibility of introducing a temperature measuring probe in the extruder barrel between two heat exchanging elements.

In addition, there is the advantage that the heat content (enthalpy) of this heat exchanger is less than that of the known system. A quick reacting, exact temperature control through regulators can thus be achieved, for example with a high speed of extrusion.

By providing grooves or ridges on the fins, an even better homogenization of the temperature distribution on the extruder cylinder can be achieved through the creation of air vortices.

Example embodiments of the invention will be described more closely in the following with reference to the attached drawing.

DESCRIPTION OF THE PREFERRED EMBODIMENTS

Figure 1:
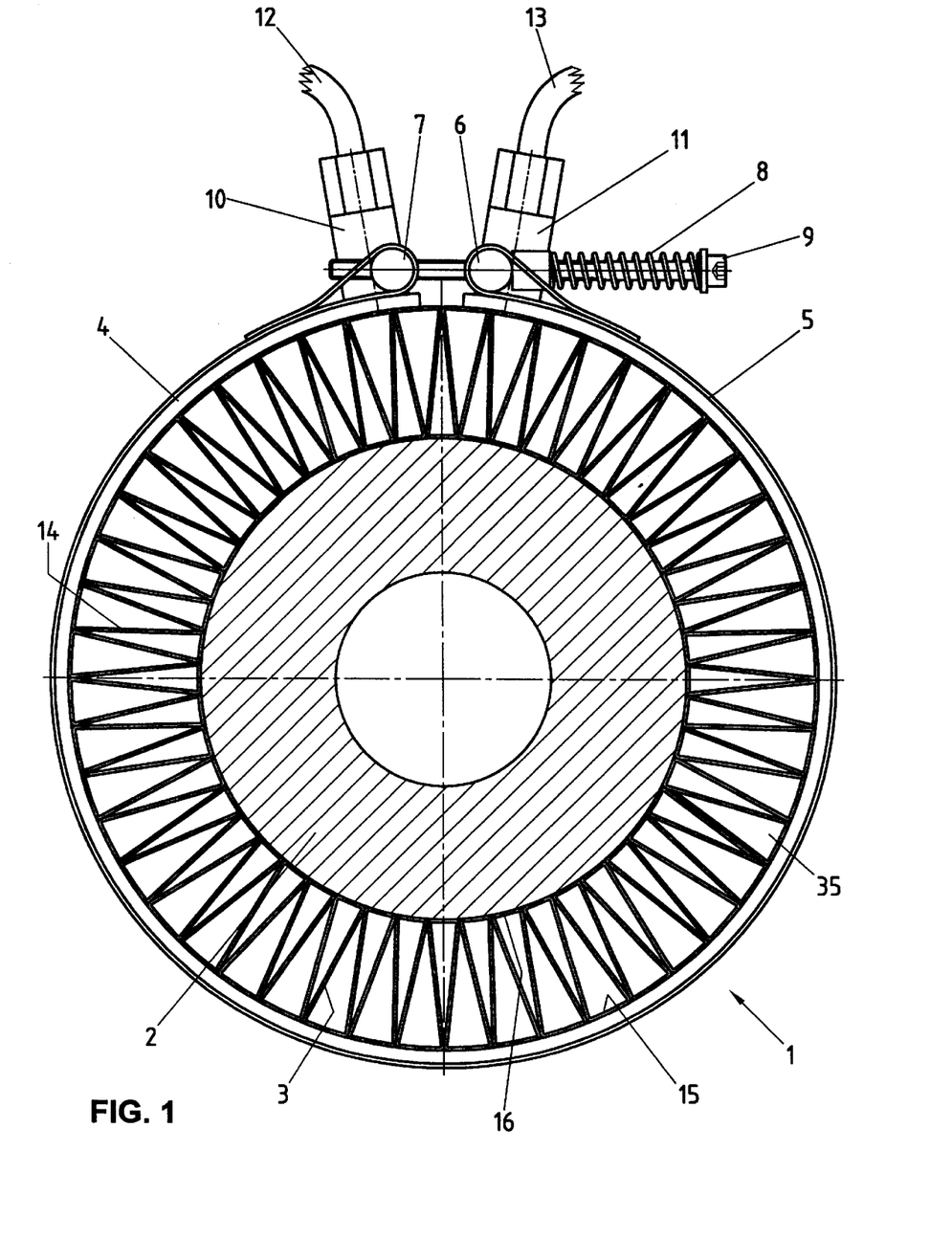
FIG. 1 is a cross-section along line I—I of FIG. 2 through a heat exchanger for a heating and cooling configuration of an extruder barrel.
Figure 2:
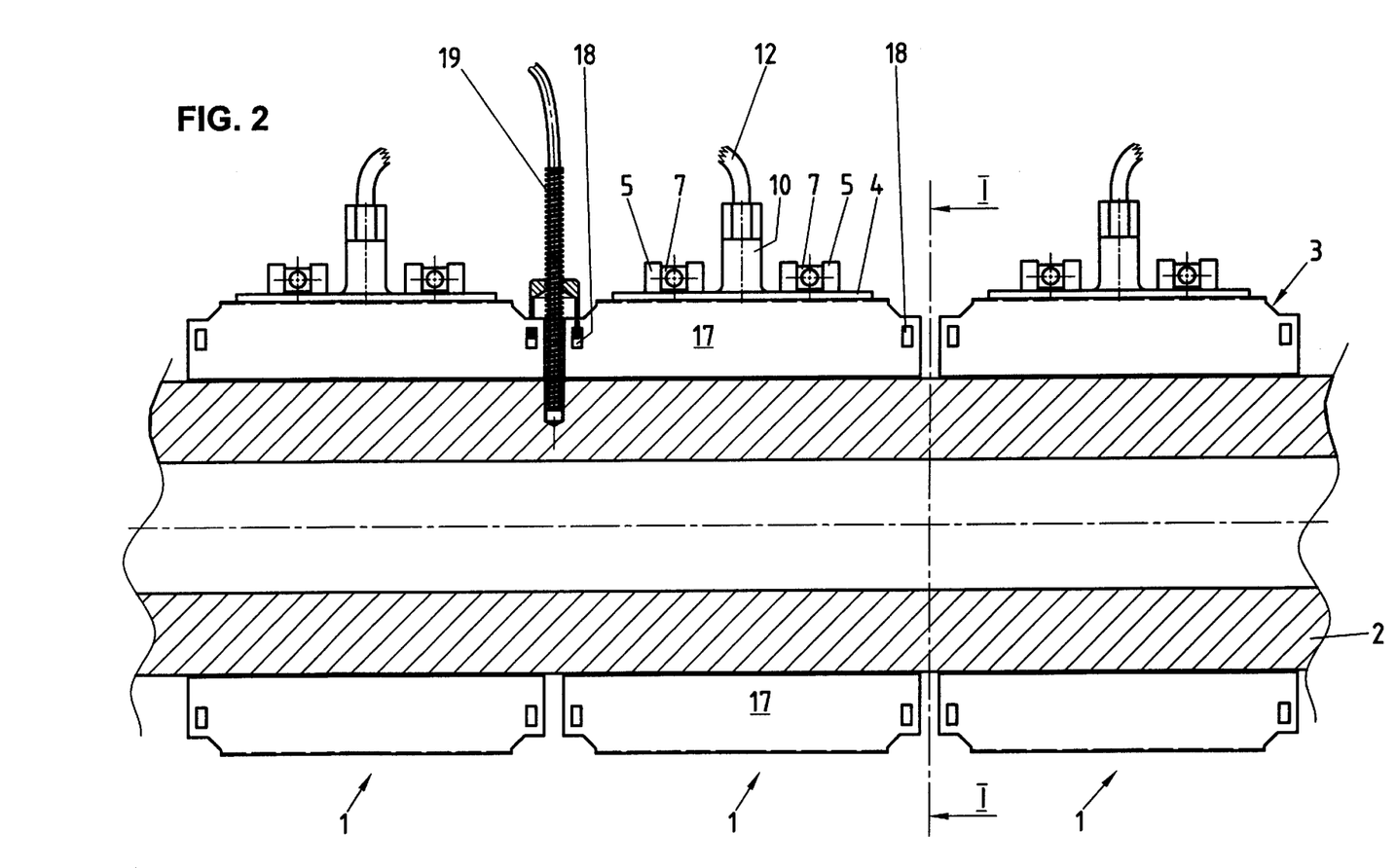
FIG. 2 is a longitudinal section through three heat exchangers, disposed as elements in a row on an extruder barrel, with a temperature measuring probe.

Shown in FIG. 1 is the heating and cooling configuration 1 for the extrusion cylinder 2 shown in cross-section along line I—I of FIG. 2. It comprises the heat exchanger made up of a configuration of fins 3 and a band-shaped, flexible heating element 4. The heat exchanger 3 is disposed concentrically with respect to the extruder barrel 2. The band-shaped, flexible heating element 4 is held together by two metal bands 5, which are provided on the ends of the pins 6 and 7. Two screws 9 provided with springs 8 are led through the pins 6 and are screwed into the pins 7. By means of the springs 8 it is ensured that the metal bands 5 for the band-shaped, flexible heating element 4 are able to expand somewhat during heating of the heat exchanger 3. The connecting cables 12, 13 for the flexible heating element are led through the connections 10 and 11, connected to the flexible heating element. The fins are designed connected, are disposed inclined with respect to one another, and are bent on their part 15 abutting the band-shaped, flexible heating element 4 and their part 16 abutting the extruder barrel 2. They are of hollow-cylindrical design, the sides 15, 16, which connect the fins 14 at their ends, forming the surfaces of the hollow cylinder. The heat is led from the outside, from the band-shaped, flexible heating element 4, by the fins 14 to the extruder barrel 2, and the extruder barrel is heated up. When the extruder is running, heat is generated, which is carried away by the heat exchanger 3. The cool air can be blown through the interim spaces 35 between the fins.

FIG. 2 shows a longitudinal section through several heating and cooling configurations 1, disposed as elements in a row with heat exchangers 3. Every second fin 17 is protracted, and each has an aperture 18 on its ends for hanging a temperature measuring probe. The temperature of the extruder barrel 2 is measured with the temperature measuring probe. Disposed concentrically with respect to the heating and cooling configurations 1 is a pipe 1a with cooling ventilator 1b.

Figure 3:
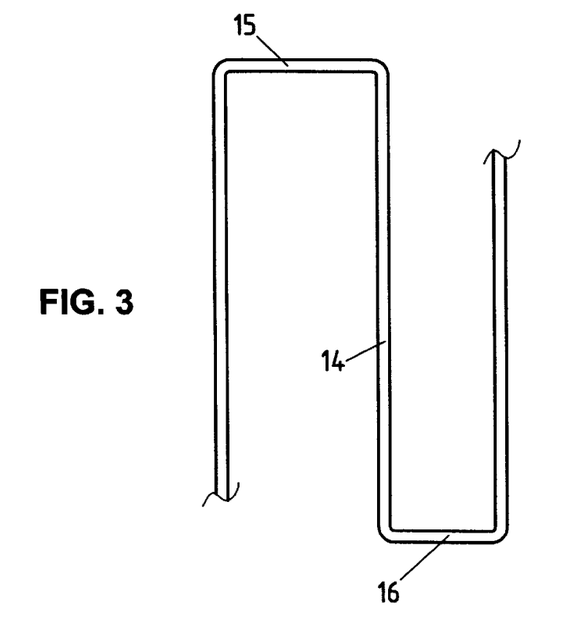
FIG. 3 shows part of the heating and cooling fins in an unbent state.

FIG. 3 shows part of the unbent fins 14 with the sides 15, 16 connecting them, without pre-shaping.

Figure 4:
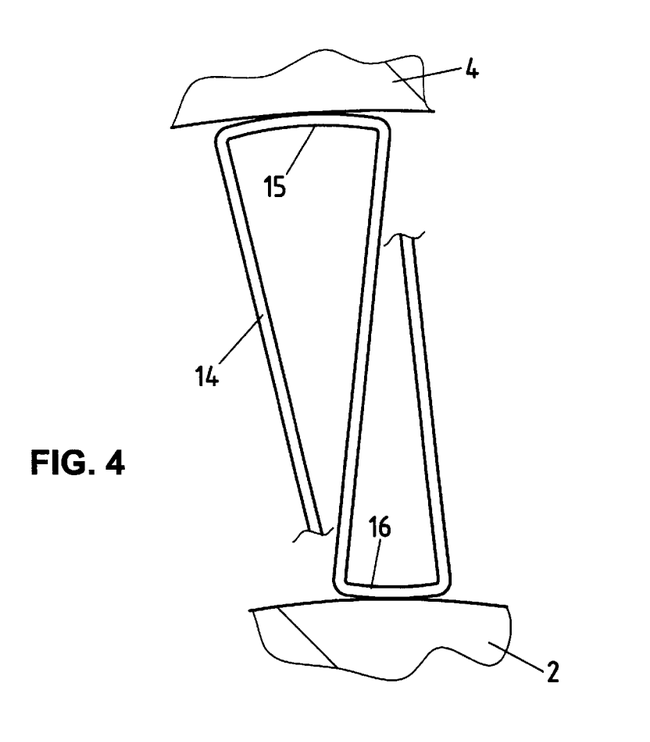
FIG. 4 shows the heating and cooling fins according to FIG. 3, bent without correction.

FIG. 4 shows part of the bent fins 14 without correction. These fins are designed roughly parabolic in cross-section in the areas 15 and 16 where they abut the band-shaped, flexible heating element 4 or respectively the extrusion cylinder 2.

Figure 5:
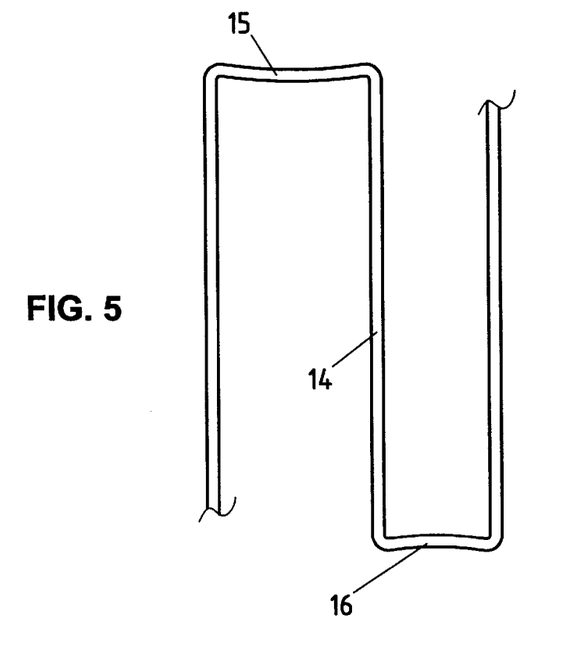
FIG. 5 shows part of the heating and cooling fins with pre-shaping on the outer sides.

FIG. 5 shows part of the fins 14, which are of roughly parabolic shape in cross-section on their sides 15 and 16.

Figure 6:
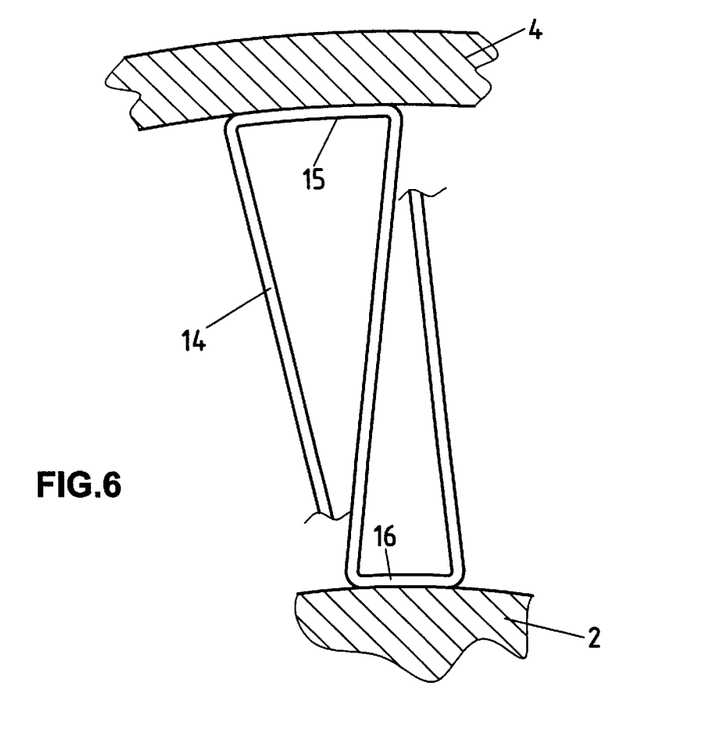
FIG. 6 shows the fins according to FIG. 5 in folded state.

FIG. 6 shows the fins according to FIG. 5 in folded state for assembly between the band-shaped, flexible heating element 4 and the extruder barrel 2. The sides 15 and 16 of the fins 14 have the same curvature as the inner surfaces of the band-shaped, flexible heating element, respectively the outer surface of the extrusion cylinder.

Figure 7:
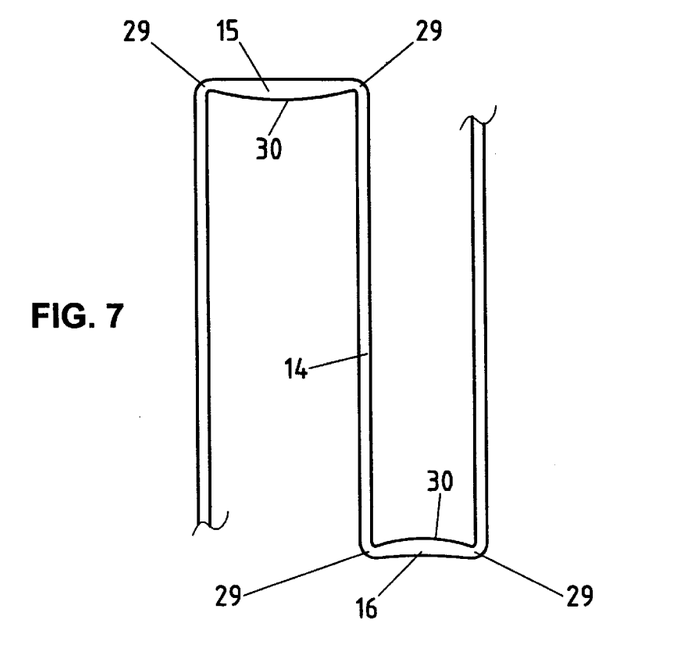
FIG. 7 shows part of the heating and cooling fins with thickened outer sides.

FIG. 7 shows part of the fins with thickened areas 30 on the sides 15 and 16. During the bending together of the fins, these thickened areas result in a constant radius of curvature of the sides 15 and 16.

Figure 8:
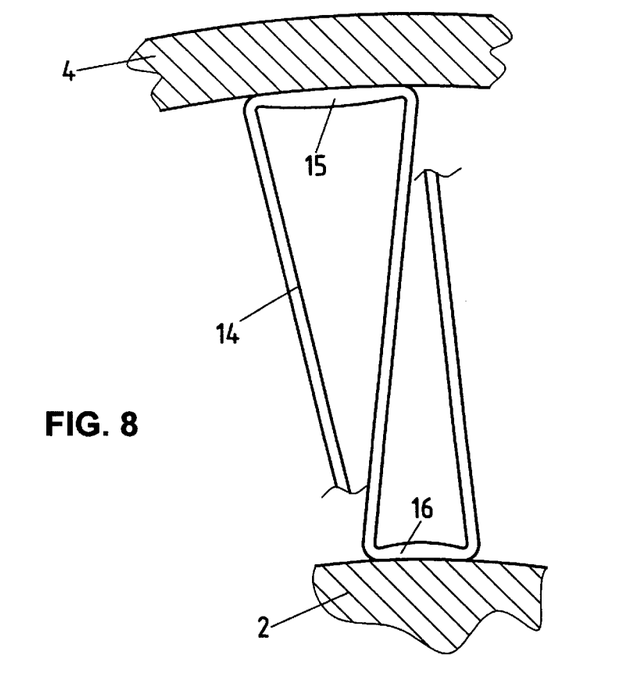
FIG. 8 shows the heating and cooling fins according to FIG. 7 in folded state.

In FIG. 8 the fins 14 are shown in folded state. Side 15 has the same radius of curvature as the inner surface of the band-shaped, flexible heating element 4, and side 16 has the same radius of curvature as the outer surface of the extruder pipe 2.

Figure 9:
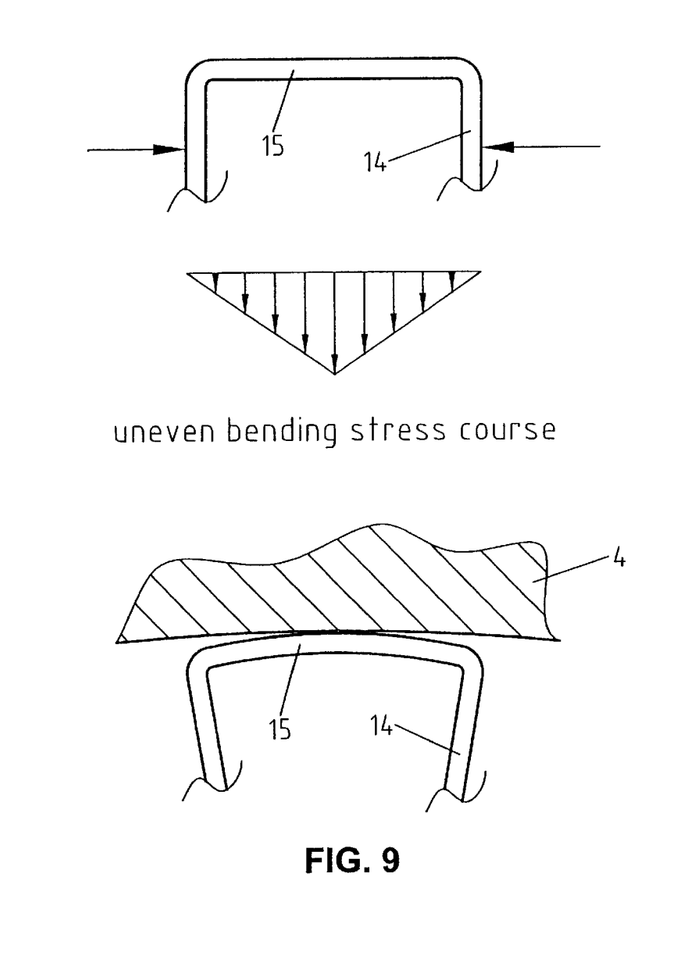
FIG. 9 shows part of the heating and cooling fins without pre-shaping in unbent and in bent states, with the associated course of bending stress.

FIG. 9 shows part of the fins, which are bent according to the example of FIGS. 3 and 4, without pre-shaping. Shown is the resulting non-uniform course of the bending stress. The outer side has a roughly parabolic course in the bent state of the fins, and does not abut the band-shaped, flexible heating element over the entire region of the side 15, which results in poor heat transmission.

Figure 10:
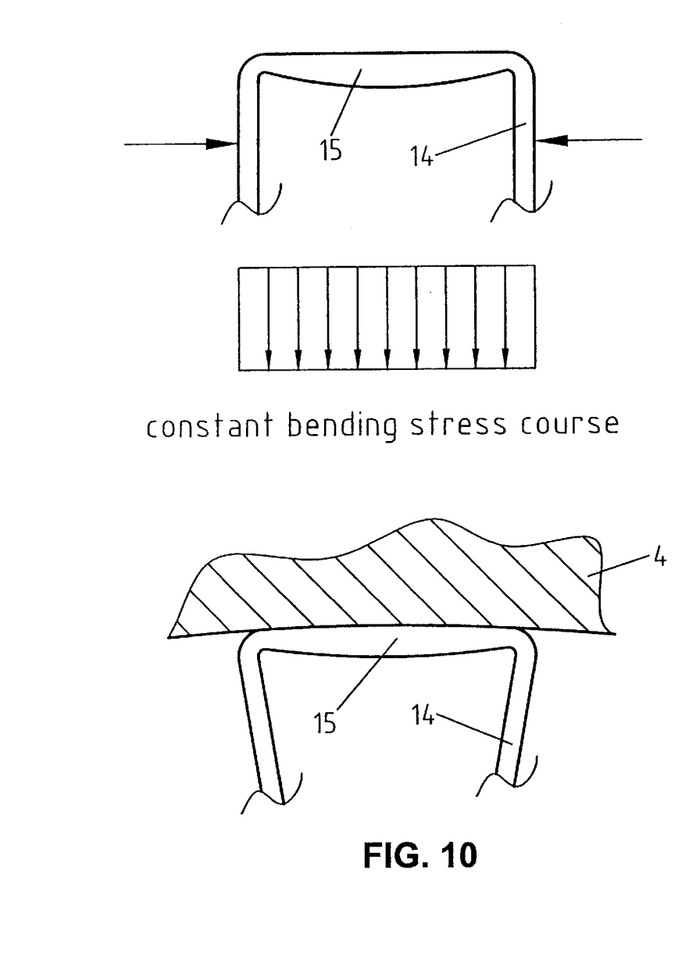
FIG. 10 shows heating and cooling fins with thickened outer sides in unbent and in bent states with the associated course of bending stress.

FIG. 10 depicts the example according to FIGS. 7 and 8, in which sides 15, 16 are provided with a thickening. Upon bending of the fins 14 a constant bending stress results. The surface of side 15 abutting the band-shaped, flexible heating element 4 is likewise cylindrically curved. It abuts the band-shaped, flexible heating element 4 evenly, resulting in very good heat transmission.

Figure 11:
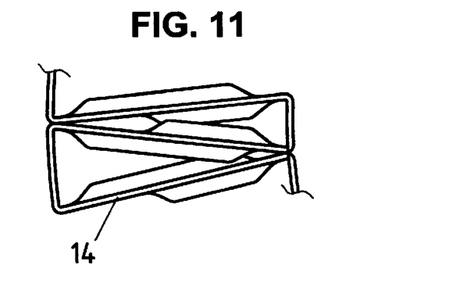
FIG. 11 shows part of the heating and cooling fins with grooves or ridges.
Figure 12:
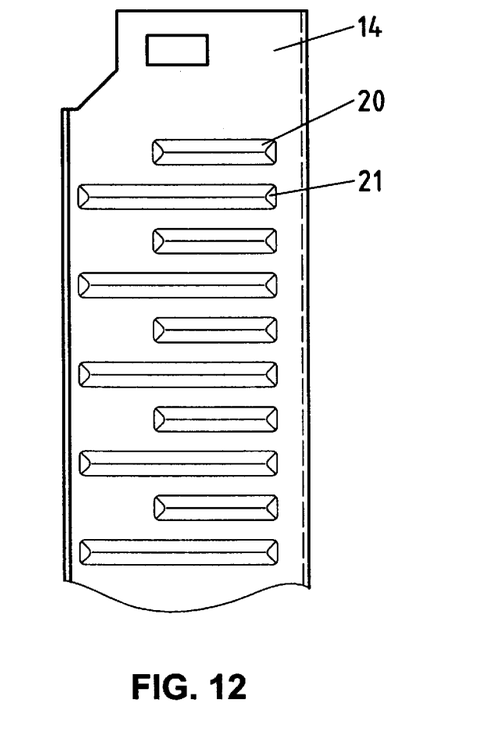
FIG. 12 is a longitudinal view of a fin with tapered grooves and ridges.

FIGS. 11 and 12 show a variant embodiment of the fins 14, in which the fins are provided with grooves or ridges 20 and 21. The short ridges or grooves 20 protrude thereby toward the rear with respect to the plane of the drawing, and the long fins protrude toward the front with respect to the plane of the drawing. The grooves or ridges serve to improve the static qualities of the fins and to create vortices of cooling air and thus contribute to more efficient cooling of the extruder barrel.

To create air vortices, the fins can also be corrugated. The grooves or ridges also result in enlargement of the surface, which likewise leads to better cooling.

Figure 13:
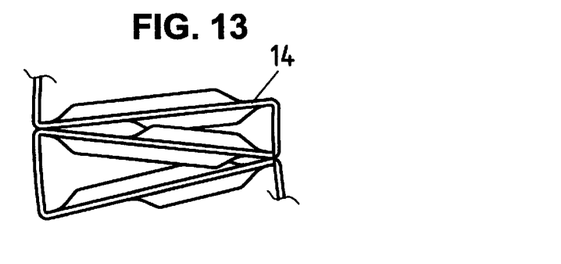
FIG. 13 shows part of the heating and cooling fins with slanted grooves or ridges.
Figure 14:
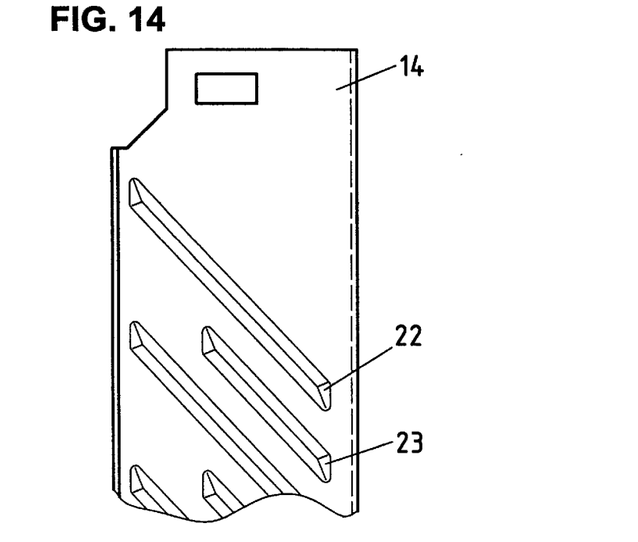
FIG. 14 is a longitudinal view of a fin according to FIG. 13 with slanted grooves or ridges.
Figure 15:
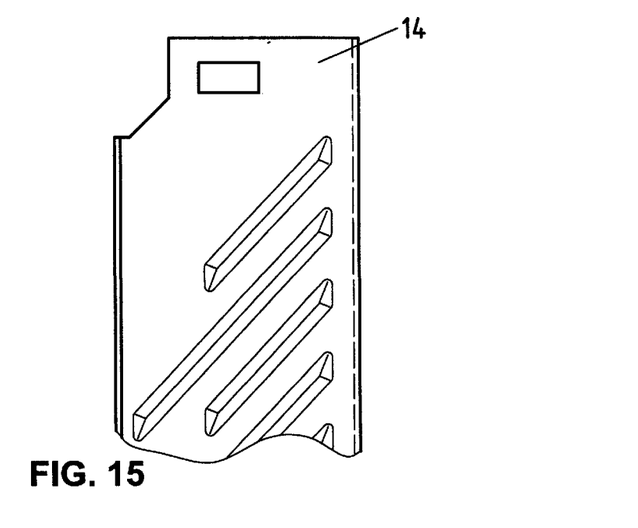
FIG. 15 shows the adjacent fins of the following heat exchanger with grooves or ridges slanting in the opposite direction.

A variant embodiment of the fins 14 is shown in FIGS. 13, 14 and 15, in which the grooves or ridges 22 and 23 are disposed slanted. The grooves or ridges 22 and 23 are also designed protruding from the fin 14 alternately toward the rear or toward the front with respect to the plane of the drawing.

FIG. 15 shows the fin of an adjacent heat exchanger according to FIG. 2. The stream of air from the ventilator is led from left to right in the case of the fin according to FIG. 14, and from right to left in the case of the fin according to FIG. 15. The grooves or ridges of the embodiment according to FIGS. 13, 14 and 15 serve to create vortices of cooling air and thus promote more efficient cooling of the extrusion cylinder.

Figure 16:
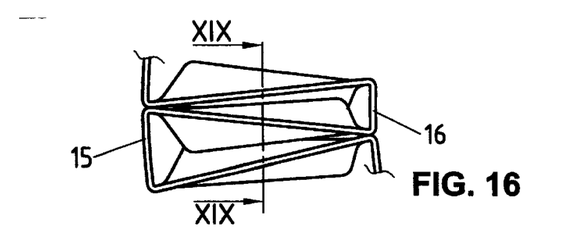
FIG. 16 shows part of the heating and cooling fins with grooves or ridges running in a tapering fashion.
Figure 17:
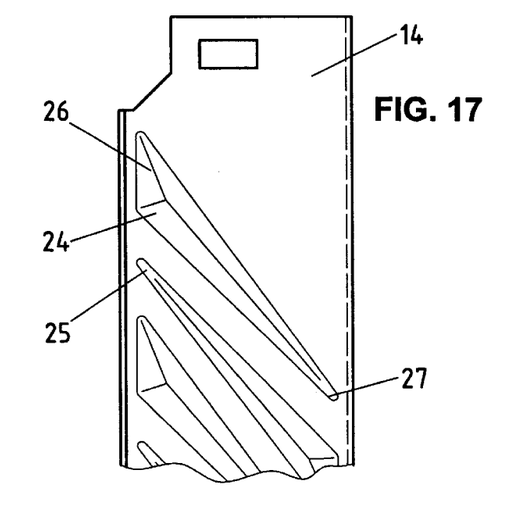
FIG. 17 is a longitudinal view of a fin according to FIG. 16 with grooves or ridges running in a tapering fashion.
Figure 18:
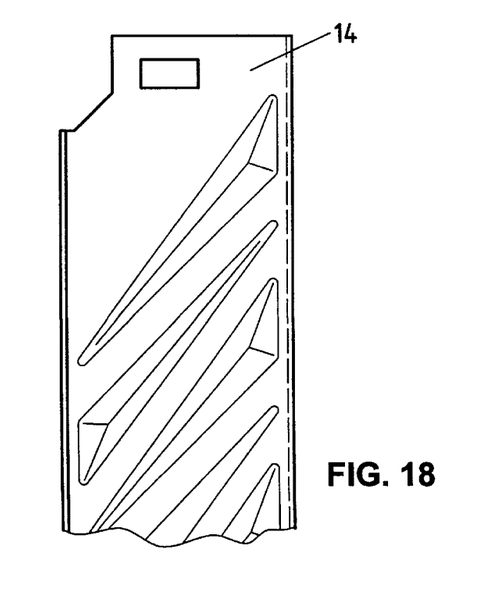
FIG. 18 shows the adjacent fin of the following heat exchanger with grooves or ridges slanting in the opposite direction.

FIGS. 16, 17 and 18 show a further variant embodiment of the fins 14 with grooves or ridges. The grooves or ridges 24 and 25 likewise protrude from the fin 14 alternately toward the rear or toward the front with respect to the plane of the drawing. The grooves or ridges have a wider end 26 and a narrower end 27. The wider end 26 is turned toward the wider side 15, and the narrower end 27 toward the narrower side 16. In the case of the fins 14 of the front heat exchanger, the cooling air flows from left to right, and in the case of the fins 14 of the following heat exchanger from right to left. These grooves or ridges likewise serve to create vortices of cooling air and thus promote more efficient cooling.

Figure 19:
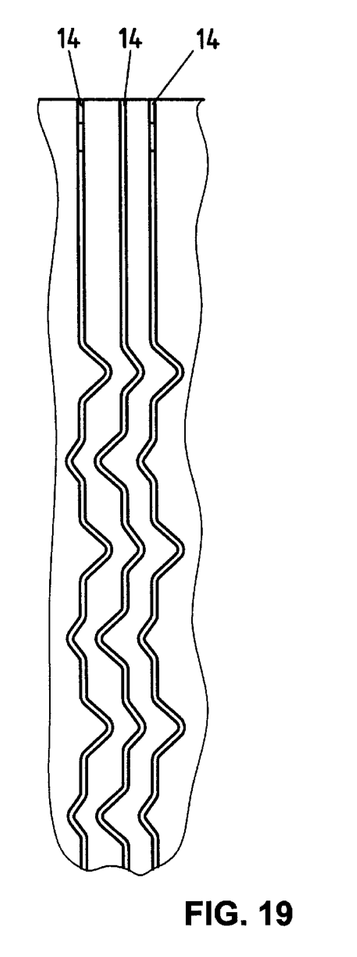
FIG. 19 is a section along line XIX—XIX of FIG. 16.

FIG. 19 shows a section along the line XIX—XIX of FIG. 16. Visible are three fins 14 with corresponding grooves or ridges.

Figure 20:
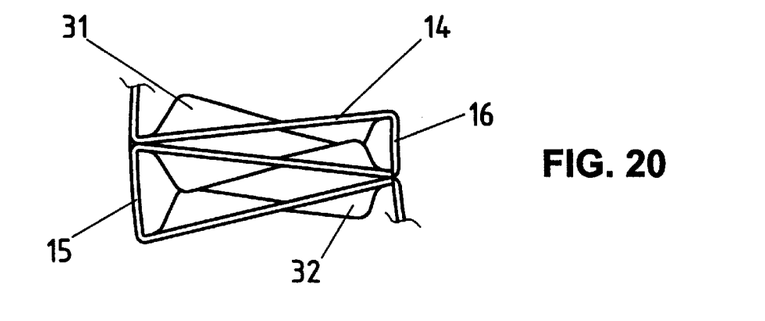
FIG. 20 shows part of the heating and cooling fins with tapering grooves or ridges divided with respect to the width of the fins.

FIG. 20 shows part of the fins 14 with tapering grooves or ridges 31 and 32, divided with respect to the width of the fins.

Figure 21:
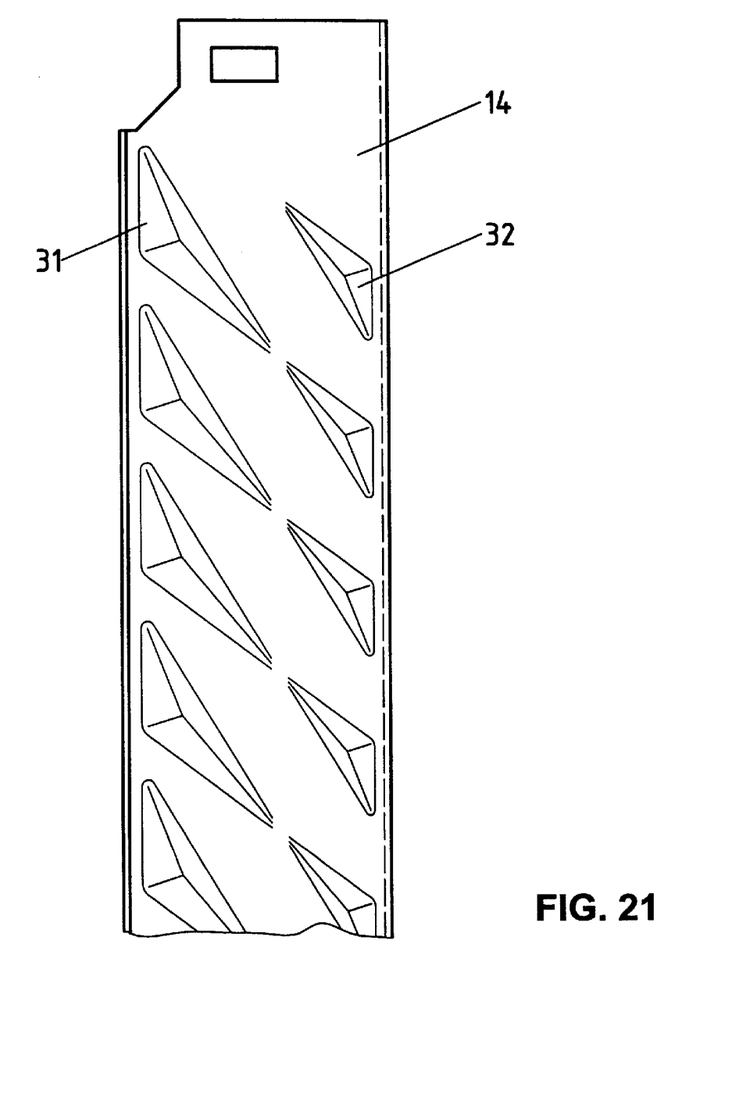
FIG. 21 is a longitudinal view of a fin according to FIG. 20.

FIG. 21 shows a longitudinal view of a fin according to FIG. 20 with grooves or ridges 31 and 32 running slanted with respect to the longitudinal axis of the fin and divided with respect to the width of the fin. The grooves or ridges 31 protrude from the fin 14 on the one side, and the grooves or ridges 32 protrude from the fin on the other side. Grooves or ridges 31 and 32 are designed tapering, the wider ends being turned toward the edges of the fin 14.

Figure 22:
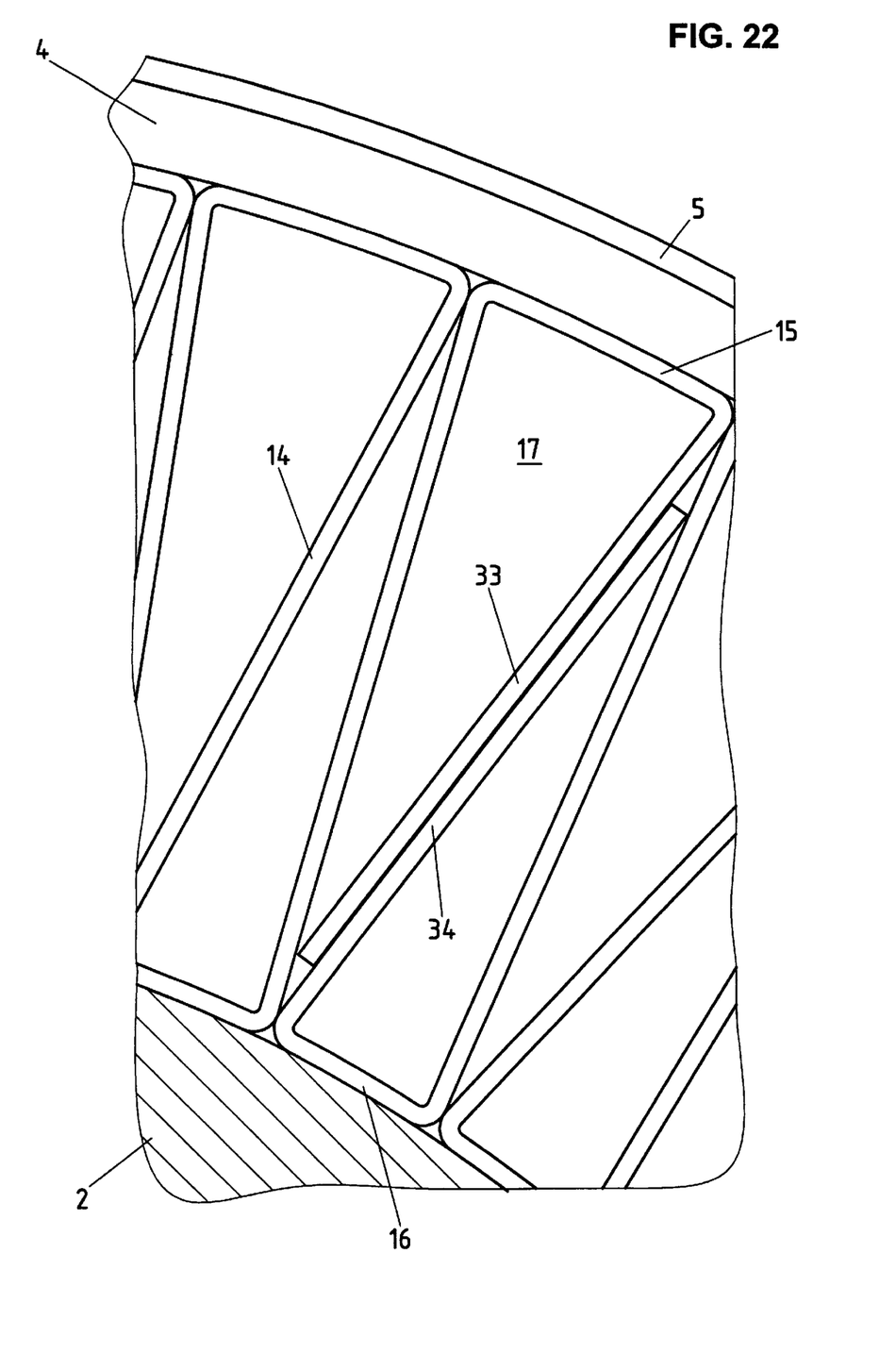
FIG. 22 shows the ends of the band of fins.

FIG. 22 shows an enlarged section of FIG. 1. The fins 14, connected and disposed as a band, overlap at the two ends 33 and 34 of the hollow-cylindrically disposed band of fins.

Figures 23, 24:
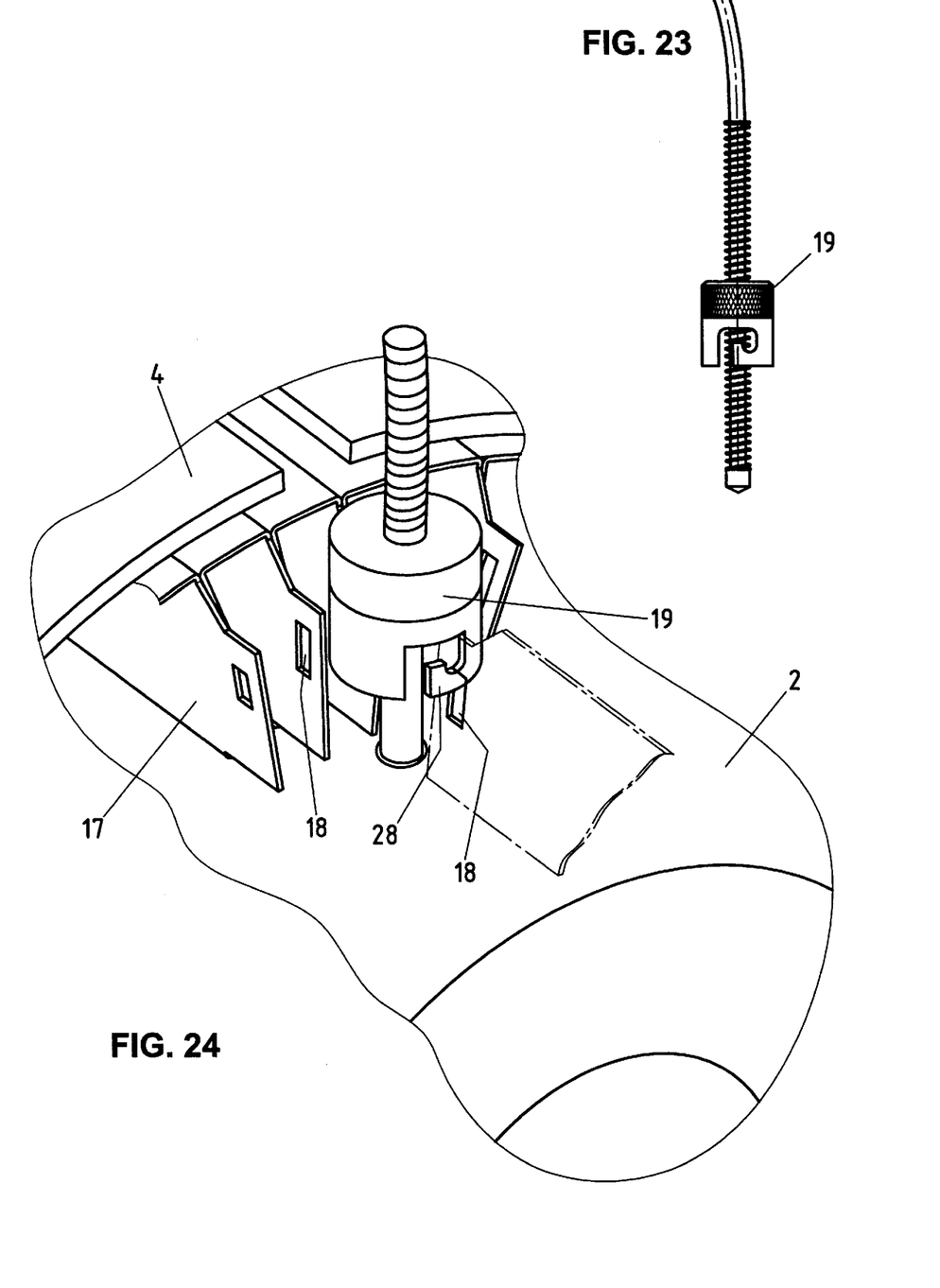
FIG. 23 is a view of the temperature measuring probe.
FIG. 24 is a perspective view of the temperature measuring probe installed between the fins of two heat exchangers in the extrusion cylinder.

FIG. 23 shows the temperature measuring probe 19 in a side view.

FIG. 24 shows, in a perspective view, the mounting of the temperature measuring probe in the extrusion cylinder 2. At most every second fin 17 is protracted so that a mounting of the measuring probe is possible. It would also be possible to provide fewer protracted fins 17. The measuring probe 19 is hung by means of hooks 28 in the apertures 18 of the protracted fins 17. It used to be necessary to cut a thread into the extruder steel in order to screw in the temperature measuring probe. With the method of fastening the measuring probe depicted here, it is only necessary to bore a hole in the extrusion cylinder, and the measuring probe can be hung in the two fin ends.

Figures 25, 26:
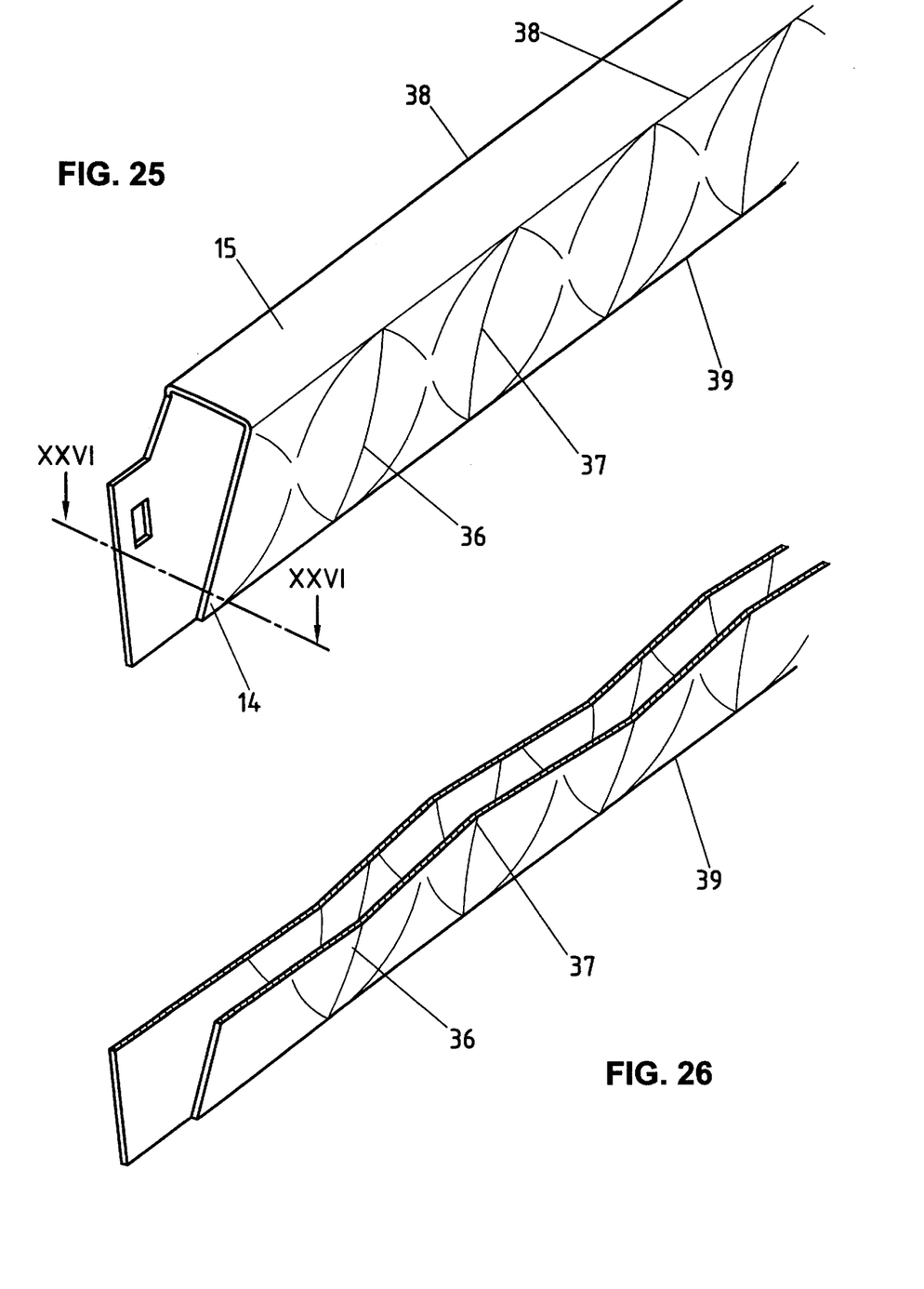
FIG. 25 is a perspective view of part of the heating and cooling fins with grooves or ridges disposed zigzag.
FIG. 26 is a section along the line XXVI—XXVI of FIG. 25.

FIG. 25 shows a perspective view of part of another embodiment of the heating and cooling fins 14 with grooves or ridges 36 and 37 domed or depressed in opposite directions and disposed zigzag. The profile edges 38 and 39 remain straight in this embodiment. The grooves or ridges serve to increase the non-buckling character of the fins.

FIG. 26 shows a section along the line XXVI—XXVI of FIG. 25.

Figure 27:
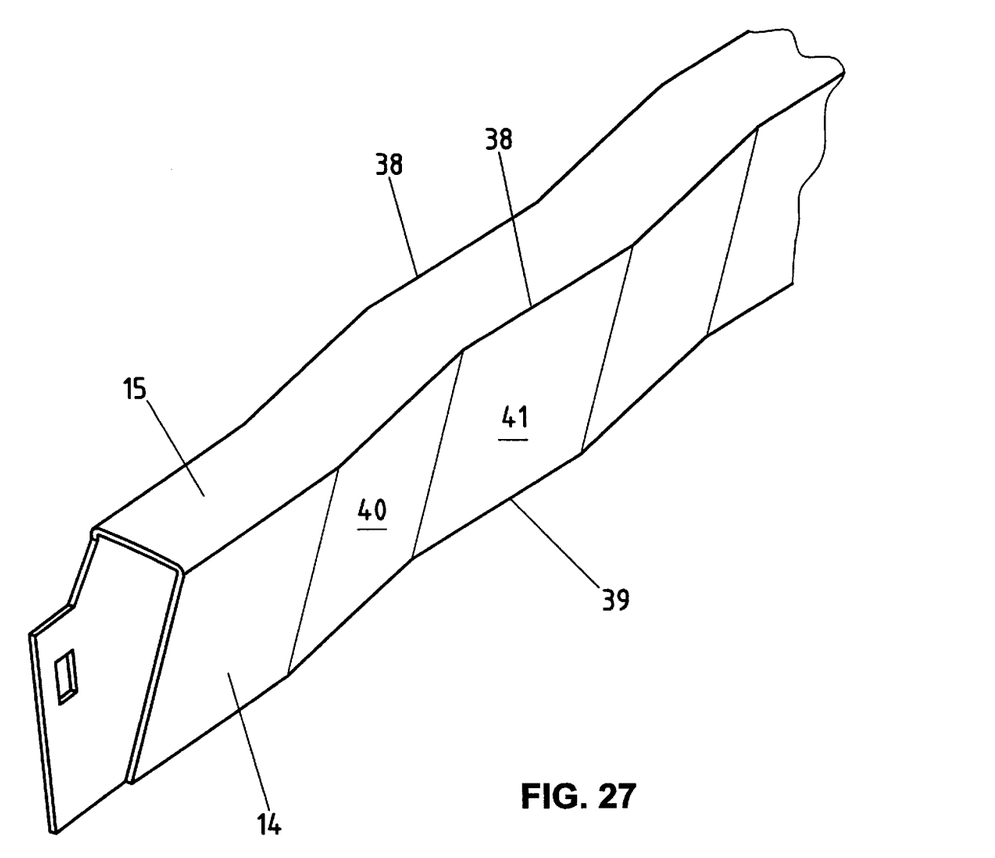
FIG. 27 is a perspective view of part of the heating and cooling fins, the entire profile section having a zigzag reinforcement.

FIG. 27 shows a perspective view of part of another embodiment of the heating and cooling fins 14, the entire profile having a zigzag reinforcement. The side surfaces 40, 41 are designed bent. The profile edges 38 and 39 are shaped zigzag. This zigzag design shown in FIG. 27 likewise serves to increase the non-buckling character of the fins.

The heat exchanger according to the invention has two functions, namely the transmission of heat from the band-shaped, flexible heating element to the extruder and heating the extruder to about 230° C. When the extruder runs, the mechanical energy is converted into heat, the temperature rising to over 230° C. At this point in time, the to cool air is blown through the fin structure, cooling the extruder. Air is blown on radially, and continues axially. At least two heating and cooling configurations should be disposed together as elements in a row. The heat exchanger cannot be used with the extrusion cylinder alone as the heating and cooling configuration. There must always be a band-shaped, flexible heating element. The band-shaped, flexible heating element expands during the extrusion process and contracts; therefore the non-buckling character of the fins is preferably increased.

The intake zone of the extruders and of the injection molding machines used to have to be cooled with water since air cooling was not effective enough. The ΔT did not suffice with air cooling. A "bore labyrinth" had to be set up for water cooling in the intake zone, which was very expensive. With the heat exchanger according to the invention, it is now possible to cool with air also in the intake zone of extruders and injection molding machines, which is significantly less expensive. The heat exchanger is used over the entire extruder barrel. In the case of injection molding machines, only the intake zone is cooled.

What is claimed is:

1. Heat exchanger for use as a heating and cooling configuration of an extruder barrel comprising at least partially joined alternately longer and shorter fins running obliquely with respect to one another along and projecting in a generally radial direction from the barrel and defining hollow passages between them exteriorly of the barrel, the fins having sides connecting the fins at their ends and forming surfaces of a hollow cylinder.

2. Heat exchanger according to claim 1, wherein alternately longer and shorter fins are provided.

3. Heat exchanger according to claim 2, wherein the longer fins are each provided with an aperture in their end regions.

4. Heat exchanger according to claim 1, wherein, before the bending together of the fins, the sides are shaped so that they deviate from a planar surface.

5. Heat exchanger according to claim 1, wherein the sides are thickened.

6. Heat exchanger according to claim 5, wherein the width of the thickening increases from the ends of the sides toward their middle.

7. Heat exchanger according to claim 1, wherein the fins are provided with grooves or ridges.

8. Heat exchanger according to claim 7, wherein the grooves or ridges protrude alternately on the two sides of the fins.

9. Heat exchanger according to claim 7, wherein the grooves or ridges are disposed inclined with respect to the longitudinal axis of the fins.

10. Heat exchanger according to claim 7, wherein the grooves or ridges are tapered.

11. Heat exchanger according to claim 7, wherein at least two grooves or ridges are disposed next to one another in the width of the fins.

12. Heat exchanger according to claim 7, wherein the grooves or ridges are bent alternately toward the outside and toward the inside, and create a zigzag structure of the fins, the profile edges running straight.

13. Heat exchanger according to claim 1, wherein the fins are bent into partial surfaces running zigzag.

14. A temperature controlled extruder barrel comprising an extruder barrel; a heat exchanger formed by at least partially joined fins running obliquely with respect to one another along and projecting in a generally radial direction from an exterior of the barrel and defining hollow passages between them, the fins having sides connecting the fins at their ends and forming surfaces of a hollow cylinder; and a band-shaped, flexible heating element disposed about radially outer ends of the fins.

15. A temperature controlled extruder barrel according to claim 14 including a plurality of heat exchangers serially arranged along a longitudinal extent of the extruder barrel; and a temperature measuring probe extending into the extruder barrel and fixed to the fins of at least two heat exchangers.

16. A temperature controlled extruder barrel according to claim 14 including a pipe having a cooling ventilator concentrically arranged with respect to the configuration.

\* \* \* \* \*